Oct. 29, 1957  A. BOBROWSKY  2,811,148
COUPLING MEANS
Filed Nov. 28, 1955
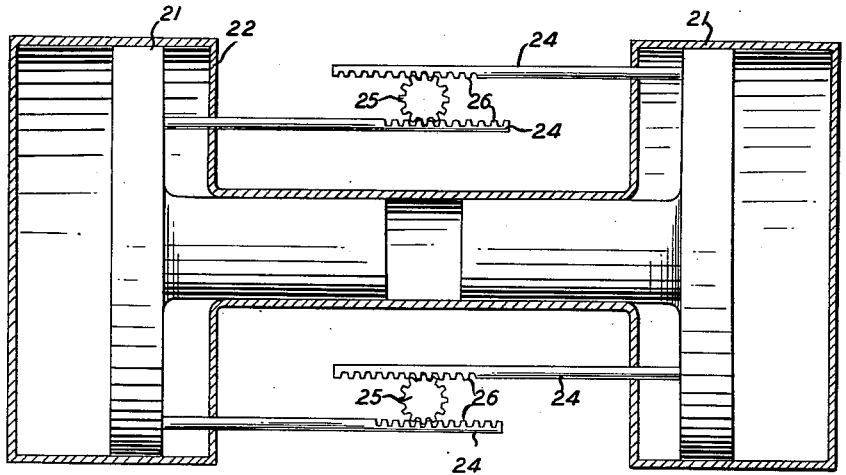
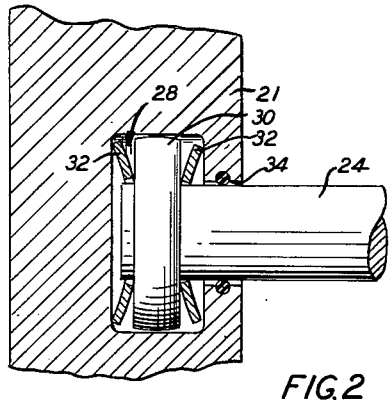
FIG. 2
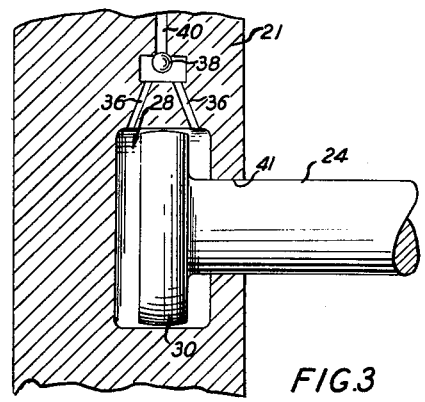
FIG. 3
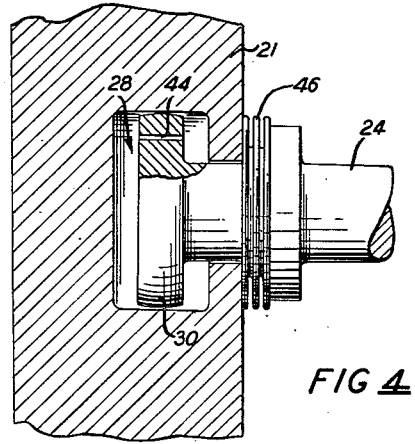
FIG. 4
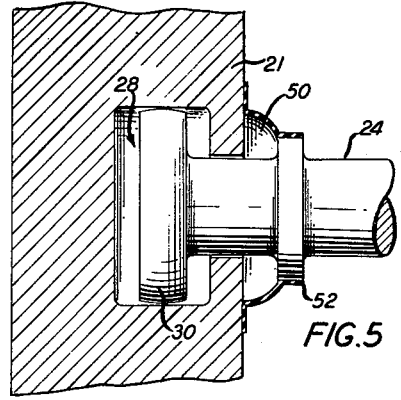
FIG. 5
A. BOBROWSKY
INVENTOR.
BY E. C. McRae
J. R. Faulkner
G. H. Oster
R. T. Seeger
ATTORNEYS

United States Patent Office 2,811,148
Patented Oct. 29, 1957

2,811,148

COUPLING MEANS

Alfred Bobrowsky, Ann Arbor, Mich., assignor to Ford Motor Company, Dearborn, Mich., a corporation of Delaware Application November 28, 1955, Serial No. 549,412

7 Claims. (Cl. 123—46)

This invention pertains to coupling means and more particularly to coupling means between synchronizing rods and pistons in a free piston engine.

In a free piston engine the motion of two opposed pistons may be synchronized by means of synchronizing rods cooperating with rotatable gears. There has in the past been experienced difficulty due to synchronizing rod variation caused by temperature inequalities, mismatched links, misalignment, unequal wear of the moving parts, and other dimensional changes not only of the synchronizing rods but also of the other parts involved in the operation of a free piston engine. This invention solves this problem by providing means to compensate for such dimensional changes without detracting from or causing looseness between the moving parts.

This is done by means of a unique linkage between the synchronizing rod and the piston of the free piston engine. Force from the piston to the synchronizing rod is transmitted through a volume of fluid which is substantially incompressible upon any sudden force such as would be experienced in the normal operation of a free piston engine. Any sustained force such as would be exerted by a dimensional change above mentioned would cause said volume of fluid to lessen or increase through a controlled leakage, thereby relieving stress of the moving parts of the engine.

It is therefore an object of this invention to provide a coupling means that will compensate for dimensional changes thereby relieving stress on the parts but at the same time prevent looseness of operation. It is an object of this invention to provide a linkage that interposes a volume of fluid between the pressure transferring members with said volume of fluid self regulating to compensate for any dimensional change.

It is a further object of this invention to provide auxiliary mechanical elastic members to work in conjunction with said volume of fluid to provide a compensator for dimensional changes.

Other important features and objects of the invention to which reference has not been made hereinabove will appear hereinafter when the following description and claims are considered with the accompanying drawing in which:

Figure 1 is a cross sectional simplified schematic view of a typical free piston assembly;

Figure 2 is a partial cross sectional view of one embodiment of this invention showing the linkage between the synchronizing rod and piston member;

Figure 3 is another embodiment of this invention showing the linkage mentioned in Figure 2;

Figure 4 is still another embodiment of this invention showing the above mentioned linkage;

Figure 5 is another embodiment of this invention showing the above mentioned linkage.

In Figure 1 is shown a typical free piston engine assembly showing two opposed pistons 21 in cylinder housing 22 with synchronizing rods 24 riding on gear wheels 25.

In order that pistons 21 may move in fixed relation to one another rods 24 at one of their ends are fixed or connected to the pistons and at the other of their ends are two gear racks 26 which ride on gears 25. Due to this arrangement it is seen that any movement by one of pistons 21 will cause the opposing piston to move an equal increment. It is also seen that if any of the above mentioned parts change dimensionally through temperature, wear, deflection, or possible misfitting parts, severe stresses, friction, and possible breakage may occur of the parts as they are relatively rigid members. This invention precludes this problem by providing a compensator means for such dimensional changes. Embodiments of this invention are shown in Figures 2, 3, 4, and 5.

Figure 2 is a partial cross sectional view of piston 21, synchronizing rod 24, compression chamber 28, annular ring 30 which is press fitted or otherwise immovably attached to rod 24, springs 32 which fit about rod 24 on either side of ring 30, and seal 34. Compression chamber 28 is filled with a fluid which may take on many forms but would preferably be of an oil composition.

It is seen that ring 30 fits relatively close to the walls of compression or adjusting chamber 28. There is a controlled leakage between ring 30 and the wall of chamber 28 allowing oil to pass from one side of ring 30 to the other depending on the relative movement between rod 24 and piston 21. Since the above mentioned control leakage is small in volume any sudden force between piston 21 and rod 24 will not provide enough time for much of the oil to move from one side of ring 30 to the other therefore, providing a relatively fixed relation between piston 21 and rod 24 for any sudden motions such as would be experienced by the rod and piston during the comparatively rapid reciprocation of piston 21 in cylinder housing 22. However, any sustained force between piston 21 and rod 24 will allow enough time for oil seepage to occur between ring 30 and the walls of chamber 28, thereby allowing some relative movement therebetween. This, therefore, provides a compensating means for any dimensional changes occurring in the piston assembly due to such things as variable temperature coefficients of expansion, misalignment, unequal wear, and other misaligning stresses. Metal springs 32 may be provided to additionally assist in the compensating takeup motion and provide a mechanical centering.

In Figure 3 is shown a second embodiment with rod 24 moving in compression chamber 28 of piston 21. Passages 36 lead from either side of ring 30 to valve 38 which seats itself on the edges of tube 40. In this manner of construction, fluid level of chamber 28 is insured through a fluid supply leading to tube 40. Valve 38 is seated against tube 40 during normal operation but when the fluid pressure drops valve 38 becomes unseated allowing fluid to pass into compression chamber 28. In this construction, if any leakage occurs at entry 41 it can be readily resupplied. The fit at entry 41 influences fluid leakage and transverse movement of rod 24 and may be designed in varying degrees for desired results.

In Figure 4 is shown still another embodiment of this invention again showing piston 21, rod 24, compression chamber 28, and ring 30. In addition is shown leakage valve 44 which may be substituted for the controlled leakage above described between ring 30 and the walls of chamber 28. Here the fit between walls of chamber 28 and ring 30 may be tight fitting and valve 44 will provide controlled leakage as is desired. The rate of leakage, of course, may be controlled by controlling the dimensions of valve 44. In addition, in this embodiment is shown seal and fluid reservoir 46 which is accordion shaped and may be of a light elastic metal. Due to the accordion shape this seal may easily accommodate relative movements between rod 24 and piston 21. By properly attaching seal 46 to rod 24 and piston 21 a very effective substantially leakproof seal is possible. With this type of seal there may be a greater clearance between rod 24 and piston 21 thereby allowing greater freedom of movement. In Figure 5 is shown another embodiment of this invention which has rod 24, pistons 21, chamber 28 and ring 30. In this embodiment a comparatively elastic metal seal 50 is used as a seal and fluid reservoir. Ridge 52 on rod 24 provides a convenient platform for the forward edge of seal 50 to be placed. Ridge 52 may be conveniently and advantageously adapted to provide a suitable fit providing a relatively tight connection with seal 50. Seals 46, 50 may be of a compensating nature whereby upon the loss of any fluid from the system the seals will be capable of contracting to a degree to take up the void created.

Valves 44, 38, seals 46, 50, springs 37 among others are not restricted to the particular embodiments shown but may be interchanged in many instances to provide an effective coupling in a particular situation. Desired results may be obtained by having only one of a pair of synchronizing rods connected to the piston in the manner of this invention.

It will be understood that the invention is not to be limited to the exact construction shown and described, but that various changes and modifications may be made without departing from the spirit and scope of the invention, as defined in the appended claims.

What is claimed is:

1. A free piston engine comprising a pair of opposed pistons interconnected by synchronizing means, at least one synchronizing connection to each piston being constructed to resist sudden relative motion between the piston and synchronizing means and to permit comparatively slow relative movement of limited extent.

2. In a coupling between the synchronizing rods and pistons of a free piston engine that improvement comprising a compression chamber, said chamber being at least partially filled with a substantially noncompressible fluid, said chamber being in the piston of a free piston engine, said chamber having an entry for the synchronizing rod, a chamber fitting member being at the piston end of said synchronizing rod, said member being moveable in said chamber and close fitting therewith, control means being located relative said member and said chamber and being of such size and construction so as to allow a predetermined rate of fluid flow upon axial forces being applied to said synchronizing rod.

3. The coupling claimed in claim 2 with said control means comprising a fluid passing clearance between said member and said chamber.

4. The coupling claimed in claim 2 with said control means comprising a passage through said member providing a controlled leakage.

5. The coupling claimed in claim 2 with said control means comprising, a one-way valve being in said free engine piston admitting fluid to said chamber so as to keep the fluid level in said chamber at a predetermined level, a passage leading from said valve to each side of said member.

6. The coupling claimed in claim 2 with a seal about said entry for said rod into said chamber, said seal being of an elastic nature so that it acts as a volume compensator for said fluid in said compression chamber.

7. The coupling claimed in claim 2 with spring means acting between said member and the chamber ends, said spring means being a force in compression between said member and said chamber ends.

References Cited in the file of this patent
UNITED STATES PATENTS

| | | |
|---|---|---|
| 668,075 | Worth | Feb. 12, 1901 |
| 1,825,163 | Schweter | Sept. 29, 1931 |
| 2,446,423 | Kilchenmann | Aug. 3, 1948 |
| 2,570,854 | Pierce | Oct. 9, 1951 |
| 2,573,688 | Butler | Nov. 6, 1951 |